(12) United States Patent
Ueda et al.

(10) Patent No.: US 8,895,657 B2
(45) Date of Patent: Nov. 25, 2014

(54) VINYL CHLORIDE RESIN AGGREGATE PARTICLES, PROCESS FOR PRODUCING SAME, AND GLOVE OBTAINED USING SAME

(75) Inventors: Takashi Ueda, Takasago (JP); Kunihiko Matsumura, Takasago (JP); Morio Ishihara, Takasago (JP); Manabu Nagamitsu, Takasago (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 13/823,609

(22) PCT Filed: May 31, 2011

(86) PCT No.: PCT/JP2011/062472
§ 371 (c)(1),
(2), (4) Date: Mar. 14, 2013

(87) PCT Pub. No.: WO2012/035830
PCT Pub. Date: Mar. 22, 2012

(65) Prior Publication Data
US 2013/0167287 A1 Jul. 4, 2013

(30) Foreign Application Priority Data
Sep. 17, 2010 (JP) .................... 2010-209600

(51) Int. Cl.
| B03D 1/016 | (2006.01) |
| C08L 29/04 | (2006.01) |
| C08J 3/00 | (2006.01) |
| B32B 5/16 | (2006.01) |
| A41D 19/00 | (2006.01) |
| C08J 5/02 | (2006.01) |
| C08J 3/16 | (2006.01) |
| C09D 127/06 | (2006.01) |

(52) U.S. Cl.
CPC ............... *C09D 127/06* (2013.01); *C08J 5/02* (2013.01); *C08J 3/16* (2013.01); *C08J 2327/06* (2013.01); *A41D 19/0055* (2013.01)
USPC ........... 524/551; 524/503; 523/326; 428/402; 2/167

(58) Field of Classification Search
CPC ..... C09D 127/06; A41D 19/0055; C08J 5/02; C08J 2327/06
USPC ........ 524/551, 503; 523/326; 428/402; 2/167
See application file for complete search history.

(56) References Cited

U.S. PATENT DOCUMENTS
4,077,135 A 3/1978 Tzschoppe et al.

FOREIGN PATENT DOCUMENTS
| JP | 51-112893 A | 10/1976 |
| JP | 2007-284512 A | 11/2007 |
| JP | 2009-227699 | * 10/2009 |
| JP | 2009-227699 A | 10/2009 |
| WO | 2008/041697 A1 | 4/2008 |

* cited by examiner

*Primary Examiner* — William Cheung
(74) *Attorney, Agent, or Firm* — Sughrue Mion, PLLC

(57) ABSTRACT

The present invention provides: vinyl chloride-based resin aggregate particles that can be produced through a heat treatment while inhibiting scale formation within a vessel for the heat treatment and that provide a plastisol with non-infiltrating property and a satisfactory sagging property; a process for producing the particles; and a glove obtained using the particles. The vinyl chloride-based resin aggregated particles are obtained by flocculating a vinyl chloride-based resin through a two-stage heat treatment consisting of a primary heat treatment and a secondary heat treatment.

15 Claims, 1 Drawing Sheet

VINYL CHLORIDE RESIN AGGREGATE PARTICLES, PROCESS FOR PRODUCING SAME, AND GLOVE OBTAINED USING SAME

CROSS REFERENCE TO RELATED APPLICATIONS

This application is a National Stage of International Application No. PCT/JP2011/062472 filed May 31, 2011, claiming priority based on Japanese Patent Application No. 2010-209600, filed Sep. 17, 2010, the contents of all of which are incorporated herein by reference in their entirety.

TECHNICAL FIELD

The present invention relates to vinyl chloride-based resin aggregate particles, a process for producing the same, and a glove obtained using the same.

BACKGROUND ART

Sheets, gloves, bags and the like coated with a vinyl chloride-based resin have great mechanical strength, and they exhibit excellent wear resistance, chemical resistance and oil resistance so that they can be used in various fields such as fishery, agriculture, mining industry and the like.

Conventionally, coating of the vinyl chloride-based resin on sheets, gloves, bags and the like has been carried out by spraying or clipping of a plastisol containing vinyl chloride-based resin aggregate particles or a gelled melt prepared by heating the plastisol.

Since a plastisol is a viscous liquid, when it is applied to a fabric or used for dipping, the plastisol may infiltrate into the fabric, sometimes into the back face of the fabric. Similarly, in a case of heating the plastisol, the gelled melt may infiltrate into the back face of the fabric. If the plastisol or the gelled melt infiltrates into the back face of the fabric, the flexibility of the coated product will deteriorate considerably to damage the product functions. In particular, when it is applied to gloves, even if the penetration is local, the obtained gloves will cause discomfort in wearing to the user, and degrade the commercial value.

For coping with such problems, Patent document 1 discloses a process for lowering the property of infiltrating into the fabric back face at the time of coating on the fabric by adding a flocculant to a vinyl chloride-based resin latex and subsequently raising the temperature to 125° C. and carrying out a heat treatment at 125° C. for 15 minutes. Namely, Patent document 1 discloses a process for producing aggregate particles including vinyl chloride-based resin with improved non-infiltrating property.

However, in a case of using the plastisol containing aggregate particles including vinyl chloride-based resin according to Patent document 1, the non-infiltrating property is improved, but the sagging property tends to be inferior to plastisol containing a paste of vinyl chloride-based resin for general-purpose. When the sagging property of the plastisol is insufficient, in a step of applying the plastisol on a fabric glove or the like that has been mounted on a mold of a hand shape and sagging excessive plastisol, the plastisol will adhere excessively to the fabric glove or the like. Such a glove on which plastisol adheres too much will be heavy and less flexible, and thus it is less comfortable in use.

In addition to that, in the process as recited in Patent document 1, there is a problem, for example, that filmy resin (hereinafter, this will be called 'scales') adheres to the wall, the pulsator or the like in a vessel (e.g., a tank) for heat treatment. Although the scales can be removed by rubbing with a wooden or plastic spatula, the productivity will deteriorate. Although the scale can be removed by a high-pressure jet system, it requires special equipment. Well-known measures for preventing scales on a tank surface include lining the inner surface of the tank with resin or glass. However, due to the influence of expansion or the like of the tank material caused by high temperature, there is a necessity of exchanging the lining frequently.

PRIOR ART DOCUMENTS

Patent Documents

Patent document 2: JP 2009-227699

DISCLOSURE OF INVENTION

Problem to be Solved by the Invention

For solving the above-mentioned problems of conventional technology, the present invention provides vinyl chloride-based resin aggregate particles that can inhibit scale formation in a vessel for heat treatment during production, and that provides a plastisol with excellent non-infiltrating property and a favorable sagging property; a process for producing the same, and a glove using the same.

Means for Solving Problem

Vinyl chloride-based resin aggregate particles of the present invention are characterized in that the aggregate particles have a mean volume particle diameter of 10 to 60 μm, and the percentage of particles having a particle diameter of 10 to 60 μm is at least 50% by volume (vol. %). A plastisol comprising 100 parts by weight (weight parts) of the aggregate particles and 160 weight parts of di-2-ethylhexyl phthalate satisfies a relationship of $3 \leq \eta 70/\eta 40 \leq 1000$ when $\eta 40$ is a viscosity at a shear rate of 1 s$^{-1}$ of a plastisol retained at 40° C. for 10 minutes and $\eta 70$ is a viscosity at a shear rate of 1 s$^{-1}$ of a plastisol that has been warmed from 40° C. at 10° C./min. and retained at 70° C. for 3 minutes.

It is preferable that in the vinyl chloride-based resin of aggregate particles of the present invention, the $\eta 70/\eta 40$ is in a range of 5 to 110.

The process of the present invention is a process for producing vinyl chloride-based resin aggregate particles of the present invention, the process includes: a primary heat treatment step of heating a coagulated latex of the vinyl chloride-based resin at a temperature not lower than Tg and not higher than Tg+35° C. when Tg is a glass transition temperature of the vinyl chloride-based resin; and a secondary heat treatment step of heating after the primary heat treatment step at a temperature in a range not lower than Tg+35° C. and not higher than Tg+70° C. and higher than the heat treatment temperature for the primary heat treatment step.

It is preferable in the process of the present invention for producing vinyl chloride-based resin aggregate particles of the present invention that the primary heat treatment step is carried out by mixing the coagulated latex of vinyl chloride-based resin with at least one heating medium selected from the group consisting of water vapor and water bath. Further, it is preferable that the vinyl chloride-based resin is a vinyl chloride resin. Further, it is preferable that the primary heat treatment step is carried out at a temperature of 80 to 115° C. Further, it is preferable that the secondary heat treatment is carried out at a temperature of 115 to 150° C. Further, it is preferable that the coagulated latex of the vinyl chloride-based resin is obtained by mixing a vinyl chloride-based resin latex and a water-soluble flocculant. Further, it is preferable that the water-soluble flocculant is at least one flocculant selected from the group consisting of a water-soluble polymer and inorganic salt. Further, it is preferable that the coagulated latex of vinyl chloride-based resin contains a polymer solid at a concentration of 35 to 42% by weight (wt %), and the coagulated latex of the vinyl chloride-based resin is poured continuously through a pipe having an inner diameter of at least 20 mm into a vessel for the primary heat treatment. Further, it is preferable that the vinyl chloride-based resin aggregate particles obtained after the secondary heat treatment has a mean volume particle diameter of 50 to 1000 μm, and the vinyl chloride-based resin aggregate particles obtained after the secondary heat treatment is pulverized so that the vinyl chloride-based resin aggregate particles have a mean volume particle diameter of 10 to 60 μm and that the percentage of particles having a particle diameter of 10 to 60 μm is at least 50 vol. %.

A glove of the present invention is a glove coated with a vinyl chloride-based resin, wherein the glove is coated with the vinyl chloride-based resin by applying plastisol on the fabric surface of the glove and subsequently heating for gelation, and the plastisol contains the vinyl chloride-based resin aggregate particles according to the present invention.

Effects of the Invention

According to the present invention, vinyl chloride-based resin aggregate particles that can provide a non-infiltrating property and a favorable sagging property to a plastisol are obtained, and scale formation within a vessel for a heat treatment at the time of production can be inhibited. Further, according to the present invention, a flexible and comfortable glove coated with a vinyl chloride-based resin can be obtained.

DESCRIPTION OF THE INVENTION

Figure 1:
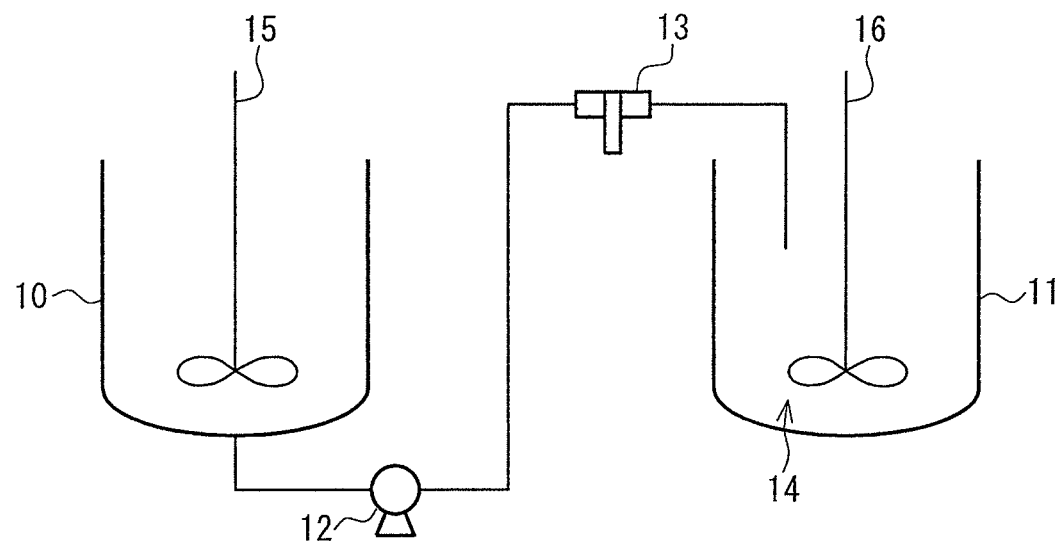
FIG. 1 is a schematic view showing an example of a step of producing vinyl chloride-based resin aggregate particles.

The vinyl chloride-based resin aggregate particles of the present invention are prepared by containing the aggregate particles in a plastisol, so that infiltration of the plastisol into the back face of the fabric, which may occur in a case of applying the plastisol on a fabric surface, can be suppressed. In the Specification, "fabric" denotes a sheet-like material made of fibers of a woven fabric, a knitted fabric, a non-woven fabric or the like. Further in the present specification, "non-infiltrating property" indicates that when the plastisol is applied on a fabric surface, infiltration into the fabric back face can be suppressed. Further in the present specification, "application" indicates an operation of adhering the plastisol onto the fabric surface through operations such as painting, sprinkling, dipping and the like.

The above-mentioned vinyl chloride-based resin aggregate particles have a mean volume particle diameter of 10 to 60 μm, and the percentage of particles having a particle diameter of 10 to 60 μm is at least 50 vol. %. It is preferable that the mean volume particle diameter is in a range of 10 to 60 vol. % from the viewpoint of suppression of increase in viscosity of the plastisol and also suppression of over-time precipitation of the vinyl chloride-based resin aggregate particles in the plastisol. Furthermore, when the percentage of particles having a particle diameter of 10 to 60 μm is at least 50 vol. % of the vinyl chloride-based resin aggregate particles, the non-infiltrating property of the plastisol containing the vinyl chloride-based resin aggregate particles is improved, the glove weight is reduced and the texture becomes favorable. From the viewpoint of non-infiltrating property, it is more preferable that the mean volume particle diameter of the vinyl chloride-based resin aggregate particles is 10 to 50 μm, and that the percentage of particles having a particle diameter of 10 to 60 μm is at least 60 vol. %. In the present invention, a mean volume particle diameter denotes the median diameter on a volumetric basis to the volume in the particle size distribution of the particles, namely, the average diameter calculated from the particle size distribution on a volumetric basis. Here, the particle size distribution of the particles can be measured by using MICROTRACK HRA9320-X-100 model (manufactured by Nikkiso Co., Ltd.).

It is preferable for the plastisol that contains the above-mentioned vinyl chloride-based resin aggregate particles, that the viscosity is changed less by the temperature rise from the viewpoint of sagging property. The sagging property of the plastisol relies on the viscosity. And the viscosity of the plastisol relies on temperature. In particular, when a plastisol that contains vinyl chloride-based resin is heated from room temperature to a temperature approximate to the glass transition temperature of the vinyl chloride-based resin, in general the viscosity of the plastisol tends to increase gradually with the proceeding of the gelation. As a result, at the time of applying the plastisol on the glove of fabric, the sagging property of the plastisol may change considerably if the viscosity changes greatly depending on the temperature of the mold for mounting the glove.

In a case where $\eta 40$ denotes a viscosity at a shear rate of 1 $s^{-1}$ of the plastisol retained at 40° C. for 10 minutes and $\eta 70$ denotes a viscosity at a share rate of 1 $s^{-1}$ of the plastisol that has been warmed from 40° C. at 10° C./min. and retained at 70° C. for 3 minutes, the viscosity change caused by the temperature rise can be evaluated by $\eta 70/\eta 40$ (hereinafter, it is recited also as heat thickening degree). Further, the evaluation of the $\eta 70/\eta 40$ (heat thickening degree) is carried out by using a plastisol containing 100 weight parts of the above-mentioned vinyl chloride-based resin aggregate particles and 160 weight parts of di-2-ethylhexyl phthalate. For the measurement, in a case of using a plastisol that has been prepared or stored at room temperature, preferably the plastisol is heated from the room temperature to 40° C. and subsequently retained at 40° C. for 10 minutes before warming to 70° C. Further, the viscosity here can be measured in a simple manner by using a commercially available rheometer having a function of temperature control, and an example thereof is AR2000 manufactured by TA Instruments.

In the present invention, when the $\eta 70/\eta 40$ of the plastisol containing the above-mentioned vinyl chloride-based resin aggregate particles is in the range of 3 to 1000, the viscosity is increased less due to the warm-up of the plastisol and the sagging property is excellent. From the viewpoint of excellent sagging property and non-infiltrating property, $\eta 70/\eta 40$ is preferably 5 to 110. When the $\eta 70/\eta 40$ (heat thickening degree) is 3 or higher, the plastisol exhibits favorable sagging property. Furthermore, the vinyl chloride-based resin aggregate particles will not disintegrate at the time of preparing the plastisol, the percentage of particles having a particle diameter of 10 to 60 µm will be at least 50 vol. % easily, and thus the non-infiltrating property will be improved. Furthermore, when the η70/η40 (heat thickening degree) is 1000 or lower, the non-infiltrating property of the plastisol is favorable. And moreover, the plastisol will experience less heat thickening even in a particularly high-temperature condition, and the sagging property is improved.

The above-mentioned η70/η40 is (heat thickening degree) changes depending on the conditions for forming the aggregate particles, for example, the type and amount of the flocculant, the concentration of the polymer solid in the coagulated latex, the type of the heating medium, heat treatment temperature, heat treatment time and the like. In the present invention, the temperature and time for heat treatment are adjusted appropriately in a condition where the type and amount of the flocculant, the concentration of the polymer solid in the coagulated latex, and the type of the heating medium are preset respectively, thereby obtaining vinyl chloride-based resin aggregate particles having η70/η40 (heat thickening degree) in a range of 3 to 1000.

The vinyl chloride-based resin aggregate particles can be obtained by flocculating the vinyl chloride-based resin. The flocculation of the vinyl chloride-based resin can be carried out by heat-treating the coagulated latex of the vinyl chloride-based resin. For example, the heat treatment of the coagulated latex of the vinyl chloride-based resin includes a two-stage heat treatment step of a primary heat treatment step and a secondary heat treatment step.

Though there is no particular limitation, it is preferable that the coagulated latex of the vinyl chloride-based resin is obtained by mixing a vinyl chloride-based resin latex and a water-soluble flocculant. When the vinyl chloride-based resin latex is coagulated with the water-soluble flocculant, the coagulation process can be completed in a short time by applying a strong shear.

Though there is no particular limitation, the vinyl chloride-based resin latex used in the present invention is obtained by preparing a vinyl chloride monomer or a mixture of a vinyl chloride monomer and a monomer that is co-polymerizable with the vinyl chloride monomer, to which adding in an aqueous medium for example, an initiator, an emulsifier, and further a dispersion adjuvant such as a high alcohol and a higher fatty acid as required, and by carrying out a micro-suspension polymerization, an emulsion polymerization, a seed micro-suspension polymerization, or a seed emulsion polymerization.

In the above-mentioned vinyl chloride-based resin latex, though there is no particular limitation, the mean volume particle diameter of the vinyl chloride-based resin is preferably 0.1 to 1.0 µm, and more preferably 0.15 to 0.5 µm. When the mean volume particle diameter of the vinyl chloride-based resin is 0.1 µm or more, the mechanical stability at the time of transportation of latex becomes favorable, and the productivity is improved. Further, when the mean volume particle diameter of the vinyl chloride-based resin is 1.0 µm or less, the obtained vinyl chloride-based resin aggregate particles have high strength, and the non-infiltrating property of the plastisol containing the vinyl chloride-based resin aggregate particles is exhibited easily. The mean volume particle diameter of the vinyl chloride-based resin can be calculated by measuring the particle size distribution of the vinyl chloride-based resin latex by use of NICOMP 380 manufactured by PARTICLE SIZING SYSTEMS.

There is no particular limitation on the monomer that is co-polymerizable with the vinyl chloride monomer, and any monomers co-polymerizable with the vinyl chloride can be used. The examples include: olefins such as ethylene, propylene and butane; vinyl esters such as vinyl acetate, vinyl propionate and vinyl stearate; vinyl ethers such as methyl vinyl ether, ethyl vinyl ether, octyl vinyl ether and lauryl vinyl ether; vinylidenes such as vinylidene chloride; unsaturated carboxylic acids and acid anhydrides thereof, such as acrylic acid, methacrylic acid, fumaric acid, maleic acid, itaconic acid, maleic anhydride and itaconic anhydride; unsaturated carboxylic esters such as methyl acrylate, ethyl acrylate, monomethyl maleate, dimethyl maleate and butylbenzil maleate; aromatic vinyl compounds such as styrene, α-methylstyrene, and divinylbenzene; unsaturated nitriles such as acrylonitrile; and crosslinking monomers such as diallyphthalate. Preferably the amount of such a monomer in use is less than 50 wt % in a mixture with the vinyl chloride monomer.

Though there is no particular limitation, for the emulsifier for example, anionic surfactant can be used at about 0.1 to 3 weight parts for 100 weight parts of monomer in general. Examples of the anionic surfactant include: potassium salts, sodium salts and ammonium salts of fatty acid, alkyl sulfuric acid, alkyl benzene sulfonic acid, alkyl sulfosuccinic acid, α-olefin sulfonic acid, and alkyl ether phosphate. From the viewpoint of non-infiltrating property and sagging property, preferably the emulsifier includes at least one selected from the group consisting of potassium salts of fatty acids, sodium salts of fatty acids and ammonium salts of fatty acids, and more preferably, at least one selected from the group consisting of potassium stearate, potassium myristate, and ammonium myristate.

Examples of the initiator include oil-soluble initiators and water-soluble initiators. Examples of the oil-soluble initiator include organic peroxide-based initiators and azo-based initiators. Examples of the organic peroxide-based initiators include: diacyl peroxides such as dilauroyl peroxide, and di-3-5,5,trimethylhexanoyl peroxide; peroxydicarbonates such as diisopropyloxydicarbonate, and di-2-ethylhexylperoxydicarbonate; and peroxyesters such as t-butylperoxy pivalate, and t-butylperoxyneodecanoate. The azo-based initiators include 2,2'-azobisisobutyronitrile, 2,2'-azobis(2,4-dimethylvaleronitrile), and 2,2'-azobis(4-methoxy-2,4-dimethylvaleronitrile). For the water-soluble initiator, ammonium persulfate, potassium persulfate, sodium persulfate, hydrogen peroxide solution or the like is used, and if necessary, a reducer such as sodium sulfite, sodium thiosulfate, formaldehyde sulfoxylate sodium dehydrate, ascorbic acid, sodium ascorbate or the like can be used concurrently. They can be used singly or as a combination of two or more.

Though there is no particular limitation, for the water-soluble flocculant, at least one flocculant selected from the group consisting of a water-soluble polymer and an inorganic salt can be used. From the viewpoint of non-infiltrating property and sagging property, it is preferable that both the water-soluble polymer and the inorganic salt are used.

For the water-soluble polymer, for example, a synthetic polymer, a natural polymer and a semi-synthetic polymer can be used. Examples of the synthetic polymer include a polymer of monomers containing acryloyl group, vinyl polymer, polyamidine, polyethylene oxide, polyethyleneimine and the like. For the polymer of monomers containing acryloyl group, for example, polyacrylamide, polymethacrylamide, polyacrylic acid, polymethacrylic acid, polyacrylic acid salt, polymethacrylic acid salt, polyacrylate, polymethacrylate and the like can be used. For the vinyl polymer, for example, vinyl polymers containing carboxyl groups, such as polyvinyl alcohol, polyvinylpyrrolidone, polyvinyl methyl ether, polyvinyl acetate and the like can be used. Examples of the natural polymer include polysaccharides, proteins and the like. For the polysaccharides, for example, starch, dextrin, glucomannan, galactomannan, gum Arabic, xanthan gum, pectin, carrageenan Locust bean gum, guar gum, traganth, chitin, chitosan, pullulan, alginate and the like can be used. For the proteins, gelatin, casein, collagen and the like can be used. Examples of the semi-synthetic polymer include cellulose ether, derivative of starch and the like. For the cellulose ether, methyl cellulose, ethyl cellulose, benzyl cellulose, trityl cellulose, cyanoethyl cellulose, aminoethyl cellulose, hydroxymethyl cellulose, hydroxyethyl cellulose, hydroxypropylmethyl cellulose, ethyl hydroxyethyl cellulose, methylhydroxypropyl cellulose, carboxymethyl cellulose, carboxyethyl cellulose and the like can be used. For the derivative of starch, for example, soluble starch, methyl starch, carboxymethyl starch and the like can be used. From the viewpoint of achieving the object of the present invention and reducing foaming during the heat treatment step in a case of using water bath and water vapor as heating media, it is preferable that polyvinyl alcohol is used for the water-soluble polymer. These water-soluble polymers can be used singly or as a combination of two or more.

Preferably, the addition amount of the water-soluble polymer is 0.01 to 10 weight parts with respect to 100 weight parts of vinyl chloride-based resin (polymer solid in the vinyl chloride-based resin latex), and more preferably, 0.1 to 2 weight parts. When the amount is in the above-mentioned range, the non-infiltrating property can be improved further, the viscosity of the coagulated latex can be kept in an appropriate range, and thus coagulated latex with fluidity can be obtained.

Examples of the inorganic salts include compounds or the like to be dissociated into cations such as $Na^+$, $K^+$, $Mg^{2+}$, $Ca^{2+}$, $Al^{3+}$, and $H^+$ and anions such as $Cl^-$, $Br^-$, $SO_4^{2-}$, $SO_3^{2-}$, $NO_2^-$, $NO_3^-$, $PO_4^{3-}$, $CO_3^{2-}$, and $OH^-$. Specifically, NaCl, KCl, $Na_2SO_4$, $CaCl_2$, $AlCl_3$, $Al_2(SO_4)_3$ and the like can be used. Preferably the addition amount of the inorganic salt is 0.1 to 10 weight parts with respect to 100 weight parts of the vinyl chloride-based resin (polymer solid in the vinyl chloride-based resin latex), and more preferably 0.3 to 3 weight parts. When the addition amount of the inorganic salt is in the above-mentioned range, homogenous coagulated latex with a favorable non-infiltrating property can be obtained in a short time.

The form of the water-soluble polymer and the water-soluble flocculant such as inorganic salt to be added to the vinyl chloride-based resin latex may be any of a solid or an aqueous solution. From the viewpoint of dispersion, an aqueous solution is preferred. It is more preferable that they are added to the vinyl chloride-based resin latex in a fluid state due to stirring or mixing. Further, it is preferable that the addition of the water-soluble polymer and the inorganic salt into the vinyl chloride-based resin latex is carried out in the latter stage or after completion of the polymerization of the vinyl chloride-based resin.

It is preferable that the operation of mixing the vinyl chloride-based resin latex and the above-mentioned water-soluble flocculant such as the water-soluble polymer and the inorganic salt is carried out so that the coagulated latex becomes homogenous in a short time in light of the purpose of achieving the object of the present invention. It is preferable, for example, that the coagulation operation is performed by using a mixer that is capable of applying strong shear force to the latex. Examples of the mixer include an onlator and a vertical vibration stirrer (e.g., Vibro Mixer manufactured by REICA Co., Ltd.). From the viewpoint of applying a shear force for homogenizing the coagulated latex in a shirt time, preferably the stirring power in the mixing (coagulating) operation is 2 $kW/m^3$ or more, and more preferably, 5 $kW/m^3$ or more.

Though there is no particular upper limitation for the stirring power in the mixing operation, from the viewpoint of the equipment cost, preferably it is 50 $kW/m^3$ or less.

The temperature of the vinyl chloride-based resin latex at the time of adding the above-mentioned water-soluble flocculant such as the water-soluble polymer and the inorganic salt may be selected suitably in a range not to raise the viscosity of the mixture after mixing the flocculant.

For the coagulated latex of the vinyl chloride-based resin obtained by mixing the vinyl chloride-based resin latex and the water-soluble flocculant, the preparation temperature is not limited particularly as long as it is lower than the glass transition temperature of the vinyl chloride-based resin, namely 20 to 50° C. in general. Here, "preparation temperature" indicates a temperature of the mixture immediately after mixing the vinyl chloride-based resin latex and the water-soluble flocculant.

In the coagulated latex of the vinyl chloride-based resin, the concentration of the polymer solid is not limited particularly as long as the object of the invention can be achieved. It is preferable that the concentration is 25 to 45 wt %, and more preferably 30 to 42 wt %. When the concentration of the polymer solid is in the range of 25 to 45 wt %, scale formation in the vessel for carrying out the heat treatment is inhibited. Further, since the increase in viscosity of the coagulated latex of the vinyl chloride-based resin is suppressed, transportation through piping at the time of addition to the vessel for the heat treatment can be carried out easily. Furthermore, the coagulated latex of the vinyl chloride-based resin will not become a paste mass, and thus, vinyl chloride-based resin aggregate particles for making a non-infiltrating plastisol can be obtained easily. It is preferable that the diameter of the piping for transportation of the coagulated latex of the vinyl chloride-based resin is 20 mm or more from the viewpoint of facilitating transportation, and more preferably, 30 mm or more. From the viewpoint of achieving both the non-infiltrating property and inhibition of scale formation, it is preferable that coagulated latex of the vinyl chloride-based resin containing a polymer solid at a concentration of 35 to 42 wt % is poured continuously through the piping having an inner diameter of 20 mm or more into a vessel for carrying out a primary heat treatment.

In a case where Tg denotes the glass transition temperature of the vinyl chloride-based resin, the primary heat treatment step is carried out by heat-treating the coagulated latex of the vinyl chloride-based resin at temperature of not lower than Tg and not higher than Tg+35° C. Though there is no particular limitation on the time period for the primary heat treatment, from the viewpoint of exhibiting the non-infiltrating property and inhibiting the scale formation, preferably the treatment is carried out for at least 30 seconds for example.

Though the glass transition temperature of the vinyl chloride-based resin varies depending on the molecular weight, composition of the copolymer or the like, in general, vinyl chloride-based resin obtained from only a monomer of vinyl chloride through a normal polymerization has a glass transition temperature of about 80° C. Measurement of the glass transition temperature can be carried out by using a differential scanning calorimeter (Model DSC220C manufactured by SII Nanotechnology Inc.) in an operation condition of temperature of 30 to 200° C. and a warm-up rate of 10° C./min. Preferably, the heat treatment temperature in the primary heat treatment step is 80 to 115° C., more preferably 85 to 100° C. When the heat treatment temperature is too low or too high, it would be difficult to obtain a non-infiltrating vinyl chloride-based resin aggregate particles, and furthermore, scales would be formed easily within the vessel used for the heat treatment. Though the heat treatment time in the primary heat treatment step is not limited particularly, preferably, after reaching a predetermined temperature, the temperature is retained for 30 seconds to 300 minutes in light of the industrial feasibility, and more preferably, for 3 to 120 minutes, and further preferably, 5 to 30 minutes. In this manner, the coagulated latex of the vinyl chloride-based resin is subjected to a primary heat treatment so as to flocculate the vinyl chloride-based resin aggregate particles, so that the scale formation in the vessel for the heat treatment can be inhibited and the non-infiltrating vinyl chloride-based resin aggregate particles can be obtained easily.

Though there is no particular limitation on the type of the heating medium to be used in the primary heat treatment step, preferably, the heating medium is at least one selected from the group consisting of water vapor and water bath. Though the type and pressure of the water vapor is not limited particularly as long as the temperature can be raised to Tg or higher of the vinyl chloride-based resin, water vapor (including saturated vapor state) of at least 0.1 MPa is preferred. In a case of water bath, water vapor may be introduced for maintaining a predetermined temperature.

In a case where the concentration of the polymer solid in the coagulated latex of the vinyl chloride-based resin is less than 35 wt %, there is no particular limitation on the method for the primary heat treatment. It is preferable, for example, the primary heat treatment is carried out by feeding water vapor to the coagulated latex of the vinyl chloride-based resin, namely, by mixing the coagulated latex of the vinyl chloride-based resin and the water vapor. The reason is that in a case where the concentration of the polymer solid in the coagulated latex of the vinyl chloride-based resin is low, a heat treatment can be performed uniformly by mixing with the water vapor. Moreover, from the viewpoint of further uniform heat treatment, preferably the water vapor is fed continuously to the coagulated latex of the vinyl chloride-based resin being stirred. Though there is no particular limitation on the rate for feeding the water vapor, from the viewpoint of productivity, preferably the rate is set so that the warm-up rate of the coagulated latex is 0.5 to 20° C./min., and more preferably 1 to 10° C./min. Though there is no particular limitation on the method of introducing the water vapor, from the industrial viewpoint, direct introduction into the coagulated latex during the heat treatment is convenient and preferable. Similarly, though there is no particular limitation on the method of stirring, stirring at least at a number of revolution to secure the fluidity of the interior of the whole tank with the pulsator is preferred.

And, in a case where the concentration of the polymer solid in the coagulated latex of the vinyl chloride-based resin is 35 wt % or more, though the method for the primary heat treatment is not limited particularly, for example, preferably the primary heat treatment is carried out by adding the coagulated latex of the vinyl chloride-based resin into the water bath that has been set to the primary heat treatment temperature. The reason is that in a case where the concentration of the polymer solid in the coagulated latex of the vinyl chloride-based resin is high, a uniform heat treatment can be carried out easily in water bath. Further, from the viewpoint of further uniform heat treatment, preferably the coagulated latex of the vinyl chloride-based resin is added continuously into the water bath. In a case where the temperature of the water bath that has been set at the primary heat treatment is lowered due to the continuous addition of the coagulated latex, it is preferable that water vapor or the like is fed continuously for the purpose of retaining the primary heat treatment temperature.

In a case where the coagulated latex of the vinyl chloride-based resin is added continuously into the water bath at a temperature adjusted for the primary heat treatment and subjected to the primary heat treatment while being discharged continuously, for example, an average residence time in the tank for the primary heat treatment (a value obtained by dividing the charging capacity (L) of the tank for the primary heat treatment by the feeding rate (L/min.) of the coagulated latex and water to be fed continuously into the primary heat treatment tank) corresponds to the primary heat treatment time. Though the primary heat treatment time is not limited particularly as long as the object of the present invention can be achieved, from the viewpoint of achieving both the non-infiltrating property and inhibition of scale formation, preferably it is 30 seconds or more.

The primary heat treatment is followed by a secondary heat treatment. The heat treatment temperature for the secondary heat treatment is not limited particularly as long as the temperature is in a range not lower than Tg+35° C. and not higher than Tg+70° C. and also higher than the heat treatment temperature for the primary heat treatment when Tg is the glass transition temperature of the vinyl chloride-based resin. The preferred range is 115 to 150° C., and more preferably, 120 to 140° C. As a result of the secondary heat treatment in the above-mentioned temperature range, the vinyl chloride-based resin aggregate particles that have been flocculated in the primary heat treatment are adhered to each other even more firmly, the non-infiltrating property of the vinyl chloride-based resin aggregate particles is improved, and at the same time, scale formation in the vessel for the heat treatment can be inhibited.

Though there is no particular limitation, in the secondary heat treatment, it is preferable to set a predetermined treatment temperature by use of water vapor. Though the type and pressure of the water vapor to be used are not limited particularly as long as heating to the temperature for heat treatment is available, from the viewpoint of improving the non-infiltrating property, water vapor of at least 0.4 MPa is preferred. Though there is no particular limitation on the method of introduction of water vapor, for example, a method of directly feeding into slurry is convenient and preferred from the industrial viewpoint.

Though the heat treatment time of the secondary heat treatment is not limited particularly, preferably it is 30 seconds to 120 minutes from the viewpoint of consistent adhesion of the aggregate particles and productivity, and more preferably, 5 to 30 minutes.

Though there is no particular limitation, the above-mentioned heat treatment can be carried out in a mixer or piping. The mixer used in the present invention is not limited particularly as long as it is an apparatus capable of mixing the coagulated latex particles as a whole to prevent the particles from precipitating. For example, an apparatus such as a stirring tank, a static mixer, an onlator or the like can be used.

Furthermore, from the viewpoint of achieving both the non-infiltrating property and inhibition of scale formation, preferably the mean volume particle diameter of the vinyl chloride-based resin aggregate particles after the secondary heat treatment is 50 to 1000 μm, more preferably 60 to 800 μm, and further preferably 75 to 750 μm.

As mentioned above, by subjecting the coagulated latex of the vinyl chloride-based resin to a two-stage heat treatment, namely, by subjecting to a primary heat treatment at a predetermined temperature and then a secondary heat treatment at a predetermined temperature higher than the temperature for the primary heat treatment, vinyl chloride-based resin aggregate particles to make a non-infiltrating plastisol is obtained and scale formation in the vessel for heat treatment can be inhibited considerably. Due to the two-stage heat treatment, non-infiltrating vinyl chloride-based resin aggregate particles can be obtained and scale formation in the vessel for heat treatment can be inhibited considerably, and the reason may be as follows. That is, after flocculating the vinyl chloride-based resin aggregate particles through the primary heat treatment at a predetermined temperature of 80 to 115° C. for example, the aggregate particles are subjected to the secondary heat treatment at a predetermined temperature higher than the primary heat treatment temperature, i.e., 115 to 150° C. for example, thereby adhering the flocculated vinyl chloride-based resin aggregate particles even further firmly.

The resin (vinyl chloride-based resin aggregate particles) after the heat treatment is recovered as a dry powder. There is no particular limitation on the method of recovering the aggregate particles as the dry powder from the slurry of the vinyl chloride-based resin aggregate particles after the heat treatment. For example, a drying step can be carried out after dewatering the resin, or a drying step can be carried out by spraying directly. Further, by pulverizing and/or classifying the dried vinyl chloride-based resin aggregate particles, it is possible to adjust the mean volume particle diameter and the particle size distribution so as to obtain a percentage of particles having a desired particle diameter.

Though there is no particular limitation on a dewaterer, for example, a decanter, a centrifugal dehydrator, a horizontal belt filter, a belt filter, a screw press, a drum filter and the like can be used.

Similarly, there is no particular limitation on the dryer. For example, an airstream dryer, a fluidizing dryer, a belt dryer, a box dryer and the like can be used. Though there is no particular limitation, typically the drying temperature is 50 to 220° C. as the hot air temperature, and 35 to 100° C. as the resin temperature.

Similarly, there is no particular limitation on the pulverizer or the crusher, and for example, a roller mill, a high-speed rotation pulverizer, a ball mill, a jet mill and the like can be used.

It is possible to add a plasticizer to the above-mentioned vinyl chloride-based resin aggregate particles so as to be used as a plastisol. As required, the plastisol may contain any vinyl chloride-based resin other than the above-mentioned vinyl chloride-based resin aggregate particles, a stabilizer, a diluent, a thinner, a filler, a reinforcer, an antioxidant, an ultraviolet absorber, a foaming agent, a flame retardant, an antistatic agent, a lubricant, a pigment, a surface preparation agent, a thixotrope, an adhesion promoter, a fungicide and the like.

Though there is no particular limitation on the above-mentioned plasticizer, examples of the applicable plasticizer include: phthalate plasticisers such as di-2-ethylhexyl phthalate, di-normal octylphthalate, dibutyl phthalate, diisononyl phthalate, and butylbenzyl phthalate; phosphate plasticizers such as tricresyl phthalate, and tri-2-ethylhexyl phthalate; adipate plasticizers such as di-2-ethylhexyl adipate; sebacate plasticizers such as di-2-ethylhexyl sebacate; azelate plasticizers such as di-2-ethylhexyl azelate; trimellites plasticizers such as tri-2-ethylhexyl trimellitate; polyester-based plasticizers; benzoate plasticizers such as di-2-ethylhexyl benzoate, diethylene glycol dibenzoate, and 2,2,4-trimethyl-1,3-pentanediol isobutylate benzoate; citrate plasticizers such as acetyl tributyl citrate; glycolate plasticizers; chlorinated paraffin-based plasticizers; chlorinated fatty acid ester-based plasticizers; epoxy-based plasticizers; and texanol isobutylate. These can be used singly or as a combination of two or more. Though there is no particular limitation on the use amount of the plasticizer, for example, it is used in a range of 50 to 200 weight parts with respect to 100 weight parts of the vinyl chloride-based resin containing the vinyl chloride-based resin aggregate particles of the present invention.

Though there is no particular limitation, examples of stabilizer that can be used for the above-mentioned stabilizer include: organotin stabilizers such as dimethyltin mercapto, dibutyltin mercapto, dioctyltin mercapto, dibutyltin malate, dioctyltin malate and dibutyltin laurate; lead-based stabilizers such as lead stearate, dibasic lead phosphite, and basic lead sulfate; calcium-zinc based stabilizers; barium-zinc based stabilizers; epoxidized soybean oil; epoxidized linseed oil; epoxidized tetrahydro phthalate; epoxidized polybutadiene; and ester phosphate. These can be used singly or as a combination of two or more. Further, though there is no particular limitation on the use amount of the stabilizer, for example, it is used in a range of 0 to 20 weight parts with respect to 100 weight parts of the vinyl chloride-based resin containing the vinyl chloride-based resin aggregate particles of the present invention.

Though there is no particular limitation, for the above-mentioned diluent, for example, 2,2,4-trimethyl-1,3-pentadiol di-isobutylate (TXIB), normal paraffin, iso-paraffin and the like can be used. These can be used singly or as a combination of two or more. Though there is no particular limitation on the use amount of the diluent, for example, it is used in a range of 0 to 200 weight parts with respect to 100 weight parts of the vinyl chloride-based resin containing the vinyl chloride-based resin aggregate particles of the present invention.

Though there is no particular limitation on the above-mentioned filler, examples of available filler include calcium carbonate, magnesium carbonate, lithium carbonate, kaolin clay, gypsum, mica, talc, magnesium hydroxide, calcium silicate, borax and the like. Similarly, though there is no particular limitation on the use amount of the filler, it is preferable in general that 0 to 500 weight parts of the filler is used with respect to 100 weight parts of the vinyl chloride-based resin containing the vinyl chloride-based resin aggregate particles of the present invention. More preferably, it is used in a range of 0 to 200 weight parts, and further preferably 0 to 100 weight parts.

For the thinner, a reinforcer, an antioxidant, an ultraviolet absorber, a foaming agent, a flame retardant, an antistatic agent, a lubricant, a pigment, a surface preparation agent, a thixotrope, an adhesion promoter, and a fungicide, these agents can be used in a range for achieving the object of the present invention.

In general, in a case of a sheet, a glove, a bag or the like obtained by applying/dipping a fabric with/in a plastisol, for improving the flexibility of the product, a large amount, i.e., 80 to 160 weight parts of plasticizer is used with respect to 100 weight parts of the vinyl chloride-based resin. When larger amount of plasticizer is used, infiltration into the back face of the fabric occurs easily. However, when the vinyl chloride-based resin aggregate particles of the present invention are used, such infiltration into the back face of the fabric will be suppressed even if a large amount of plasticizer is blended. The reason may be that the vinyl chloride-based resin aggregate particles retain the plasticizer.

The plastisol containing the vinyl chloride-based resin aggregate particles obtained in the above-mentioned manner is applied on the fabric surface of the glove and heated for gelation, thereby a glove coated with the vinyl chloride-based resin is obtained. The glove, which has been treated with the plastisol that contains the vinyl chloride-based resin aggregate particles and that is excellent in non-infiltrating property and sagging property, is light-weighted, flexible and comfort in use. Further, the glove has an improved mechanical strength, excellent wear resistance, chemical resistance and oil resistance, and thus it can be used in various fields such as fisheries, agriculture, mining and the like.

EXAMPLES

The present invention will be further specified below with reference to Examples. It should be noted that the present invention is not limited to the Examples. In the description below, "%" and "part(s)" indicate respectively "wt %" and "weight part(s)" unless there is any annotation.

First, methods of measurement and evaluation used in Examples and Comparative Examples are explained.

(Glass Transition Temperature)

Measurement was carried out by using a differential scanning calorimeter (Model DSC220C manufactured by SII Nanotechnology Inc.) in an operation condition of temperature of 30 to 200° C. and a warm-up rate of 10° C./min.

(Mean Volume Particle Diameter of Vinyl Chloride-based Resin)

Vinyl chloride-based resin latex was used as a test sample. The particle size distribution was measured at 25° C. by using NICOMP 380 manufactured by PARTICLE SIZING SYSTEMS. The measurement cycle was 3 minutes×5 times, and the mean volume particle diameter of the vinyl chloride-based resin was calculated from the particle size distribution on a volumetric basis in the Gaussian distribution of the fifth data. The measurement conditions were: laser wavelength: 635 nm; strength: 1.2; illuminating angle: 90°; liquid viscosity: 0.933 cP; and refractive index: 1.333. A glass vessel that is 6 mm in inner diameter, 50 mm in height, which is manufactured by Kimble Chase Life Science and Research Products, LLC, was used, and measurement was carried out in a Drop-In Cell method. For the measurement sample, vinyl chloride-based resin latex was used. The latex was previously filtered with a wire screen of 350 mesh, to which ion-exchange water filtered with a 0.2 µm filter was added, and the strength was adjusted to a range of 300±50.

(Shear Force at the Time of Coagulation of Vinyl Chloride-based Resin Latex)

Regarding the shear force to be applied at the time of coagulating the vinyl chloride-based resin latex, the stirring power was employed for the index, the stirring torque at the time of stirring was calculated from the actual measurement value, which was then classified into three grades below.

Strong: stirring power is 5 kW/m³ or more (extremely-strong shear force is applied).

Moderate: stirring power is not less than 2 kW/m³ and less than 5 kW/m³.

Weak: stirring power is less than 2 kW/m³ (shear force is weak).

(Evaluation of Foaming Property at the Time of Heat Treatment)

Figure 2:
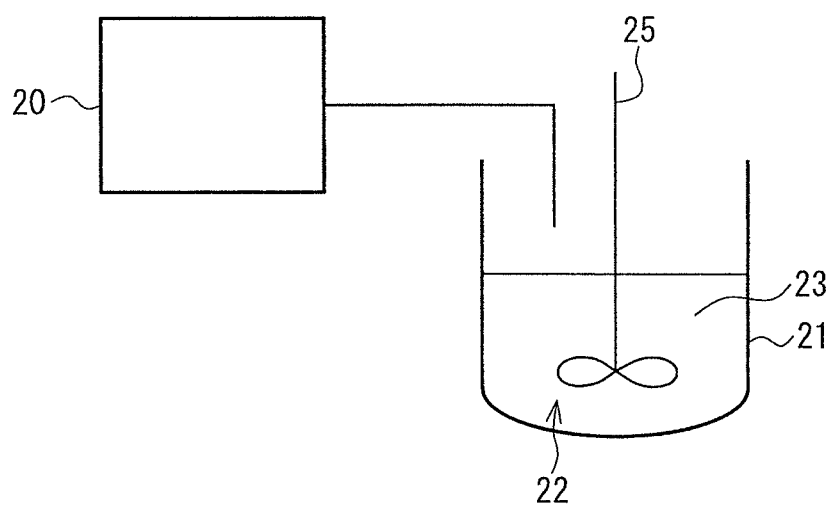
FIG. 2 is a schematic view showing another example of a step of producing vinyl chloride-based resin aggregate particles.

In the heat treatment as shown in FIG. 2 where water bath and water vapor were used as the heating media, the thickness of a foam layer (thickness of foam layer from the actual liquid surface) generated on the gas-liquid interface during the heat treatment (primary heat treatment) was evaluated as an index of foaming property in the three grades below. Grade-A and Grade-B indicate 'acceptable', and grade-C indicates 'unacceptable'.

A: thickness of the foam layer is less than 5 cm.
B: thickness of the foam layer is not less than 5 cm and less than 20 cm.
C: thickness of the foam layer is 20 cm or more (unfavorable foaming property).

(Mean Volume Particle Diameter and Particle Percentage of Vinyl Chloride-based Resin Aggregate Particles)

The particle size distribution of the vinyl chloride-based resin aggregate particles was measured on a volumetric basis by using MICROTRACK HRA9320-X-100 Model (manufactured by Nikkiso Co., Ltd.), thereby calculating the mean volume particle diameter. The measurement conditions were: temperature: 25° C.; substance information: transparent; refractive index: 1.51; and spherical particles: no check. Water was used for the carrier, and the refractive index was set to 1.33. Furthermore, SET ZERO: 10 seconds; measurement time: 10 seconds; and DRY CUT: no calculation. Based on the particle size distribution measured similarly to the above manner, a volume fraction (%) of the particles having a particle diameter of 10 to 60 µm was calculated to make the percentage (vol. %) of particles having a particle diameter of 10 to 60 µm.

(Method for Measuring $\eta 70/\eta 40$)

First, 100 weight parts of vinyl chloride-based resin (aggregate particles) was added to 160 weight parts of plasticizer (di-2-ethylhexyl phthalate), which was kneaded at 25° C. at 500 rpm for 3 minutes by using a dissolver-type kneader (ROBO MICS manufactured by TOKUSHU KIKA; having a dissolver wing 5 cm in diameter), thereby preparing a plastisol. The warm-up viscosity of the obtained plastisol was measured by using a rheometer (model: AR2000; rotor: flat plate 4 cm in diameter; gap: 0.35 mm; shear rate: 1 s$^{-1}$) manufactured by TA Instruments. In the measurement, a plastisol prepared at 25° C. was set in the rheometer, heated to 40° C. at a warm-up rate of 5° C./min. Thereafter it was retained at 40° C. for 10 minutes, heated to 70° C. at a warm-up rate of 10° C./min., and then retained at 70° C. for 3 minutes. The $\eta 70/\eta 40$ was calculated by setting the viscosity at the time of retaining at 40° C. for 10 minutes as $\eta 40$ and by setting the viscosity at the time of retaining at 70° C. for 3 minutes as $\eta 70$.

(Evaluation of Non-infiltrating Property)

To 100 weight parts of vinyl chloride-based resin aggregate particles, 125 weight parts of plasticizer (dioctyl phthalate) and 3 weight parts of stabilizer (trade name: "SC73" manufactured by Asahi Denka Co., Ltd) were added, which was mixed and defoamed for 10 minutes at room temperature by using a grinder manufactured by Ishikawa Kojo so as to obtain a plastisol that was used for an evaluation of non-infiltrating property. For an infiltration test with respect to fabrics, the plastisol was cast-coated to be about 3 mm in thickness on a knitted fabric (circularly knitted or flatly knitted) of 35 gauge and 216 g/m² in metsuke (weight per unit) formed of cotton yarn No. 32 (cotton count), immediately after that it was introduced into a hot air circular furnace of 180° C. and treated with heat for 3 minutes in order to melt the gel, followed by a gelation-melting infiltration test for checking infiltration of the melt into the back face of the fabric. The evaluation is performed visually. Grade-A and Grade-B indicate 'acceptable', while Grade-C indicates 'unacceptable'.

A: the gel does not infiltrate into the back face of the fabric.
B: the gel infiltrates slightly into the back face of the fabric.
C: the gel infiltrates into the back face of the fabric (poor non-infiltrating property).

(Evaluation of Sagging Property)

To 100 weight parts of vinyl chloride-based resin aggregate particles, 75 weight parts of general-purpose vinyl chloride resin paste ("PSM-30" manufactured by KANEKA CORPORATION), 210 weight parts of plasticizer (di-2-ethylhexyl phthalate), and 3 weight parts of stabilizer ("SC73" manufactured by Asahi Denim Co., Ltd.) were added, which was mixed and defoamed for 10 minutes in a stirring tank at 25° C.

so as to prepare a plastisol. Separately, a test tube 3 cm in outer diameter and 20 cm in length (corresponding to a mold) and also a fabric [a knitted fabric (circularly knitted or flatly knitted) of 35 gauges and 216 g/m² in weight per unit using a cotton yarn No. 32 (cotton count)] 2.5 cm in outer diameter and 15 cm in length that had been sewn to be shaped like a test tube so as to be tightly mounted to the outside of the test tube were prepared. The fabric was covered on the outside of the test tube from the bottom so that the seams of the fabric would be faced inside. This was a laboratory level substitute for a fabric glove mounted on a mold. The fabric was bound to the test tube at the upper end with a cotton yarn in order to prevent the fabric from shifting during a measurement. A test tube covered with the fabric (sample) was retained for 1 hour in a hot air circulative thermostat of 70° C. so as to heat the sample to 70° C. Immediately after taking the sample out from the thermostat, the plastisol prepared in the above-mentioned manner was applied by flowing down from the upper side of the fabric. Subsequently the sample applied with the plastisol was hung with its bottom facing downward for 10 minutes under a 25° C. atmosphere in order to drip excessive plastisol. Later, the sample was heated in a furnace adjusted at 190° C. for 10 minutes so as to gelate the plastisol. After air-cooling the sample taken out of the furnace, the fabric coated with the gel was detached from the test tube and cut from the bottom to be 10 cm in length. The sagging property of the plastisol was evaluated by measuring the weight of fabric coated with the gel after being cut to be 10 cm in length. In the following evaluation in three grades, Grade-A and Grade-B indicate 'acceptable' while Grade-C indicates 'unacceptable'.

A: the weight is less than 10 g.
B: the weight is not less than 10 g and less than 12 g.
C: the weight is 12 g or more (unfavorable sagging property of plastisol).

(Evaluation of Scale)

After the interior of the vessel (tank) for the heat treatment was washed for 5 minutes with tap water of 0.5 MPa, scales within the tank were evaluated according to the following three grades. Grade-A and Grade-B indicate 'acceptable' while Grade-C indicates 'unacceptable'.

A: deposition on the inner wall of tank is a trace.
B: some deposition on the inner wall of tank can be observed.
C: there is a large amount of deposition on the inner wall of tank.

Manufacture Example 1

Into a 300 L jacketed pressure-resistant vessel, 110 kg of vinyl chloride monomer, 110 kg of ion-exchange water, 40 g of ammonium persulfate and 0.3 g of copper (II) sulfate pentahydrate (catalyst for redox reaction) were charged and warmed to 50° C., to which 9 kg of 1% sodium sulfite aqueous solution and 7 kg of 10% ammonium myristate aqueous solution were added continuously while stirring so as to be polymerized. After performing polymerization until the polymerization pressure was lowered by 0.15 MPa from the initial pressure (0.7 MPa), the residual monomer was recovered to obtain vinyl chloride-based resin latex. The polymerization invert ratio of the finally-obtained vinyl chloride-based resin latex with respect to the total amount of the initially-charged monomer and the added monomer (hereinafter described as the whole monomer amount) was 90%. In the obtained vinyl chloride-based resin latex, the mean volume particle diameter of the vinyl chloride-based resin was 0.3 μm. The concentration of the polymer solid in the vinyl chloride-based resin latex was 46%. The glass transition temperature of the vinyl chloride-based resin measured in the above-mentioned manner was about 80° C.

Manufacture Example 2

A vinyl chloride-based resin latex was obtained similarly to Manufacture example 1 except that the charged monomer substance was a mixture of 104.5 kg of vinyl chloride monomer and 5.5 kg of vinyl acetate monomer. In the obtained vinyl chloride-based resin latex, the mean volume particle diameter was 0.3 μm. The concentration of the polymer solid in the vinyl chloride-based resin latex was 46%. The glass transition temperature of the vinyl chloride-based resin measured in the above-mentioned manner was about 78° C.

Manufacture Example 3

A vinyl chloride-based resin latex was obtained similarly to Manufacture example 1 except that the charged monomer substance was a mixture of 99 kg of vinyl chloride monomer and 11 kg of vinyl acetate monomer. In the obtained vinyl chloride-based resin latex, the mean volume particle diameter was 0.3 μm. The concentration of the polymer solid in the vinyl chloride-based resin latex was 46%. The glass transition temperature of the vinyl chloride-based resin measured in the above-mentioned manner was about 76° C.

Manufacture Example 4

A vinyl chloride-based resin latex was obtained similarly to Manufacture example 1 except that the charged monomer substance was a mixture of 93.5 kg of vinyl chloride monomer and 16.5 kg of vinyl acetate monomer. In the obtained vinyl chloride-based resin latex, the mean volume particle diameter was 0.3 μm. The concentration of the polymer solid in the vinyl chloride-based resin latex was 45%. The glass transition temperature of the vinyl chloride-based resin measured in the above-mentioned manner was about 74° C.

Example 1

114 kg of the vinyl chloride-based resin latex obtained in Manufacture example 1 was charged in a first mixer 10 (300 L tank) equipped with a stirrer 15 as shown in FIG. 1. Next, 1 part of 10% sodium sulfate (inorganic salt) as a water-soluble flocculant was added with respect to the polymer solid in the vinyl chloride-based resin latex and also pure water was added so that the concentration of the polymer solid in the vinyl chloride-based resin would be 30%, which was mixed for 1 minute and the temperature was adjusted to 40° C. Later, 3% PVA (polyvinyl alcohol: water-soluble polymer) aqueous solution ("GOHSENOL KH17" manufactured by Nippon Synthetic Chemical Industry Co., Ltd.) was added as a water-soluble flocculant so that the PVA would be 0.5 parts with respect to the polymer solid in the vinyl chloride-based resin latex. This was stirred and mixed for 30 minutes so as to obtain coagulated latex of the vinyl chloride-based resin.

The obtained coagulated latex of vinyl chloride-based resin was sent by a pump 12 to a second mixer 11 (300 L tank) equipped with a stirrer 16. During this solution-sending, the coagulated latex was mixed with water vapor of 0.3 MPa by use of a vapor mixer 13 so that the outlet temperature of the vapor mixer 13 would be 95° C. After finishing the solution-sending, in the second mixer 11, the mixture of the coagulated latex of the vinyl chloride-based resin and the water vapor was retained at 95° C. for 30 minutes while being stirred, i.e., subjected to a primary heat treatment.

After the primary heat treatment, water vapor 14 of 0.7 MPa was introduced directly into the second mixer 11 including 181 kg of the obtained coagulated latex of vinyl chloride-based resin, while being stirred in order to prevent temperature irregularity, until the inner temperature reached 140° C., thereby subjected to a secondary heat treatment for 15 minutes. Later, cold water was flown on the jacket of the second mixer 11 so as to cool the second mixer 11. At the stage where the inner temperature of the second mixer 11 got to 80° C. or lower, slurry was discharged from the second mixer 11, thereby obtaining slurry containing vinyl chloride-based resin aggregate particles (hereinafter, this will be described also simply as aggregate particles). Subsequently the slurry that had been subjected to the heat treatment was dewatered through filtration, and the thus obtained wet resin was subjected to a ventilation drying for 48 hours by using a constant temperature dryer (DX402 model, supplied by Yamato Scientific Co., Ltd.) that had been set at 60° C., thereby obtaining a dry powder (aggregate particles). Further, the obtained dry powder was pulverized with Mikro Bantam Mill AP-B pulverizer manufactured by Hosokawa Micron Corporation such that the mean volume particle diameter and the percentage of particles having a particle diameter in the range of 10 to 60 µm would be the values as shown in Table 1, thereby obtaining pulverized particles (aggregate particles).

Example 2

Pulverized particles (aggregate particles) were obtained similarly to Example 1 except that the heat treatment temperature for the secondary heat treatment was set to 120° C. The mean volume particle diameter of the obtained pulverized particles (aggregate particles) and the percentage of particles having a particle diameter of 10 to 60 µm are as shown in Table 1.

Example 3

Pulverized particles (aggregate particles) were obtained similarly to Example 1 except that the coagulated latex of the vinyl chloride-based resin and water vapor of 0.3 MPa were mixed so that the outlet temperature of the vapor mixer 13 would be 90° C. and that the primary heat treatment was carried out at 90° C. The mean volume particle diameter of the obtained pulverized particles (aggregate particles) and the percentage of particles having a particle diameter of 10 to 60 µm are as shown in Table 1.

Example 4

As shown in FIG. 2, in a mixer 20, 3.1 kg of pure water was added to 15.5 kg of vinyl chloride-based resin latex that had been obtained according to Manufacture example 1, which was adjusted to 40° C. Subsequently, while being stirred, 1 part of 10% sodium sulfate was added with respect to the polymer solid in the vinyl chloride-based resin latex, and 3% PVA aqueous solution ("GOHSENOL" KH17 manufactured by Nippon Synthetic Chemical Industry Co., Ltd.) was added so that the PVA would be 0.5 weight parts with respect to the polymer solid in the vinyl chloride-based resin latex, thereby obtaining coagulated latex of vinyl chloride-based resin in which the concentration of the polymer solid was 35 wt %.

19.5 kg of hot water 23 (95° C.) was charged into a 50 L tank 21 equipped with a stirrer 25, to which the coagulated latex of vinyl chloride-based resin obtained as mentioned above was added continuously for about 10 minutes. After finishing the addition, the materials were retained at 95° C. for 30 minutes while being stirred, i.e., subjected to a primary heat treatment. After the primary heat treatment, the concentration of the polymer solid in the coagulated latex of the vinyl chloride-based resin was 18%. During the primary heat treatment, water vapor 22 of 0.3 MPa was fed continuously so that the temperature of the mixture would be retained at 95° C.

After the primary heat treatment as mentioned above, water vapor 22 of 0.3 MPa was fed continuously. After warming up to 115° C., it was retained for 15 minutes, thereby subjected to a secondary heat treatment. Later, cool water was flown on the jacket of the 50 L tank 21 so as to cool down the 50 L tank 21. At the stage where the inner temperature of the 50 L tank 21 got to 80° C. or lower, slurry was discharged from the 50 L tank 21, thereby obtaining slurry containing vinyl chloride-based resin aggregate particles. Subsequently, the slurry that had been subjected to the heat treatment was dewatered through filtration, and the thus obtained wet resin was subjected to a ventilation drying for 48 hours by using a constant temperature dryer (DX402 model, supplied by Yamato Scientific Co., Ltd.) that had been set at 60° C., thereby obtaining a dry powder (aggregate particles). Further, the obtained dry powder was pulverized with Mikro Bantam Mill AP-B pulverizer manufactured by Hosokawa Micron Corporation such that the mean volume particle diameter and the percentage of particles having a particle diameter in the range of 10 to 60 µm would be the values as shown in Table 1, thereby obtaining pulverized particles (aggregate particles).

Example 5

Pulverized particles (aggregate particles) were obtained similarly to Example 4 except that the secondary heat treatment was carried out at 125° C. The mean volume particle diameter of the obtained pulverized particles (aggregate particles) and the percentage of particles having a particle diameter of 10 to 60 µm are as shown in Table 1.

Example 6

Pulverized particles (aggregate particles) were obtained similarly to Example 5 except that the concentration of the polymer solid in the coagulated latex of the vinyl chloride-based resin was set to 40 wt %. The mean volume particle diameter of the obtained pulverized particles (aggregate particles) and the percentage of particles having a particle diameter of 10 to 60 µm are as shown in Table 1.

Example 7

Pulverized particles (aggregate particles) were obtained similarly to Example 5 except that the concentration of the polymer solid in the coagulated latex of vinyl chloride-based resin was set to 42 wt % and the primary heat treatment was carried out at 80° C. The mean volume particle diameter of the obtained pulverized particles (aggregate particles) and the percentage of particles having a particle diameter of 10 to 60 µm are as shown in Table 1.

Example 8

Pulverized particles (aggregate particles) were obtained similarly to Example 6 except that the primary heat treatment was carried out at 115° C. The mean volume particle diameter of the obtained pulverized particles (aggregate particles) and the percentage of particles having a particle diameter of 10 to 60 μm are as shown in Table 1.

Example 9

Pulverized particles (aggregate particles) were obtained similarly to Example 6 except that the secondary heat treatment was carried out at 150° C. The mean volume particle diameter of the obtained pulverized particles (aggregate particles) and the percentage of particles having a particle diameter of 10 to 60 μm are as shown in Table 1.

Example 10

Pulverized particles (aggregate particles) were obtained similarly to Example 5 except that the retention time in the primary heat treatment was set to 30 seconds (0.5 minutes). The mean volume particle diameter of the obtained pulverized particles (aggregate particles) and the percentage of particles having a particle diameter of 10 to 60 μm are as shown in Table 1.

Example 11

Pulverized particles (aggregate particles) were obtained similarly to Example 5 except that the retention time in the primary heat treatment was set to 300 minutes. The mean volume particle diameter of the obtained pulverized particles (aggregate particles) and the percentage of particles having a particle diameter of 10 to 60 μm are as shown in Table 1.

Example 12

Pulverized particles (aggregate particles) were obtained similarly to Example 5 except that methyl cellulose ("METOLOSE SM-100" manufactured by Shin-Etsu Chemical Co., Ltd.) was used for the water-soluble polymer. The mean volume particle diameter of the obtained pulverized particles (aggregate particles) and the percentage of particles having a particle diameter of 10 to 60 μm are as shown in Table 2.

Example 13

Pulverized particles (aggregate particles) were obtained similarly to Example 5 except that PVA of a low saponification index ("420HY" manufactured by Kuraray Co., Ltd.) was used for the water-soluble polymer. The mean volume particle diameter of the obtained pulverized particles (aggregate particles) and the percentage of particles having a particle diameter of 10 to 60 μm are as shown in Table 2.

Example 14

Pulverized particles (aggregate particles) were obtained similarly to Example 5 except that hydroxyl propylmethyl cellulose ("METOLOSE 90SH-100" manufactured by Shin-Etsu Chemical Co., Ltd.) was used for the water-soluble polymer. The mean volume particle diameter of the obtained pulverized particles (aggregate particles) and the percentage of particles having a particle diameter of 10 to 60 μm are as shown in Table 2.

Example 15

Pulverized particles (aggregate particles) were obtained similarly to Example 5 except that calcium chloride was used for the inorganic salt and that 1 part of 10% calcium chloride was added with respect to the polymer solid in the vinyl chloride-based resin latex. The mean volume particle diameter of the obtained pulverized particles (aggregate particles) and the percentage of particles having a particle diameter of 10 to 60 μm are as shown in Table 2.

Example 16

Pulverized particles (aggregate particles) were obtained similarly to Example 5 except that aluminum sulfate was used for the inorganic salt and that 1 part of 10% aluminum sulfate was added with respect to the polymer solid in the vinyl chloride-based resin latex. The mean volume particle diameter of the obtained pulverized particles (aggregate particles) and the percentage of particles having a particle diameter of 10 to 60 μm are as shown in Table 2.

Example 17

Pulverized particles (aggregate particles) were obtained similarly to Example 5 except that sodium chloride was used for the inorganic salt and that 1 part of 10% sodium chloride was added with respect to the polymer solid in the vinyl chloride-based resin coagulated latex. The mean volume particle diameter of the obtained pulverized particles (aggregate particles) and the percentage of particles having a particle diameter of 10 to 60 μm are as shown in Table 2.

Example 18

Pulverized particles (aggregate particles) were obtained similarly to Example 5 except that the vinyl chloride-based resin latex obtained in the Manufacture example 2 was used, and that the primary heat treatment was carried out at 90° C. and the secondary heat treatment was carried out at 120° C. The mean volume particle diameter of the obtained pulverized particles (aggregate particles) and the percentage of particles having a particle diameter of 10 to 60 μm are as shown in Table 2.

Example 19

Pulverized particles (aggregate particles) were obtained similarly to Example 5 except that the vinyl chloride-based resin latex obtained in the Manufacture example 3 was used, and that the primary heat treatment was carried out at 85° C. and the secondary heat treatment was carried out at 115° C. The mean volume particle diameter of the obtained pulverized particles (aggregate particles) and the percentage of particles having a particle diameter of 10 to 60 μm are as shown in Table 2.

Example 20

Pulverized particles (aggregate particles) were obtained similarly to Example 5 except that the vinyl chloride-based resin latex obtained in the Manufacture example 4 was used, and that the primary heat treatment was carried out at 80° C. and the secondary heat treatment was carried out at 110° C. The mean volume particle diameter of the obtained pulverized particles (aggregate particles) and the percentage of particles having a particle diameter of 10 to 60 μm are as shown in Table 2.

Example 21

Pulverized particles (aggregate particles) were obtained similarly to Example 5 except that the concentration of the polymer solid in the coagulated latex of vinyl chloride-based resin was set to 30 wt % and that the stirring power in the operation for coagulating the vinyl chloride-based resin latex performed by using the mixer 20 was set to less than 2 kW/m³. The mean volume particle diameter of the obtained pulverized particles (aggregate particles) and the percentage of particles having a particle diameter of 10 to 60 μm are as shown in Table 2.

Comparative Example 1

Pulverized particles (aggregate particles) were obtained similarly to Example 1 except that the secondary heat treatment temperature was set to 110° C. The mean volume particle diameter of the obtained pulverized particles (aggregate particles) and the percentage of particles having a particle diameter of 10 to 60 μm are as shown in Table 3.

Comparative Example 2

Pulverized particles (aggregate particles) were obtained similarly to Example 6 except that the secondary heat treatment temperature was set to 160° C. The mean volume particle diameter of the obtained pulverized particles (aggregate particles) and the percentage of particles having a particle diameter of 10 to 60 μm are as shown in Table 3.

Comparative Example 3

Pulverized particles (aggregate particles) were obtained similarly to Example 6 except that the primary heat treatment temperature was set to 75° C. The mean volume particle diameter of the obtained pulverized particles (aggregate particles) and the percentage of particles having a particle diameter of 10 to 60 μm are as shown in Table 3.

Comparative Example 4

Pulverized particles (aggregate particles) were obtained similarly to Example 6 except that the primary heat treatment temperature was set to 120° C. The mean volume particle diameter of the obtained pulverized particles (aggregate particles) and the percentage of particles having a particle diameter of 10 to 60 μm are as shown in Table 3.

Comparative Example 5

Pulverized particles (aggregate particles) were obtained similarly to Example 1 except that coagulated latex of vinyl chloride-based resin and water vapor of 0.5 MPa were mixed so that the outlet temperature at the vapor mixer 13 would be 140° C. and that the heat treatment was carried out at 140° C. The mean volume particle diameter of the obtained pulverized particles (aggregate particles) and the percentage of particles having a particle diameter of 10 to 60 μm are as shown in Table 3.

Comparative Example 6

Pulverized particles (aggregate particles) were obtained similarly to Example 5 except that the pulverization was carried out so that the mean volume particle diameter would be 20 μm and that the percentage of particles having a particle diameter of 10 to 60 μm was at least 45 vol. %.

The non-infiltrating property, the sagging property and the heat thickening degree of the vinyl chloride-based resin aggregate particles (pulverized particles) obtained in Examples and Comparative Examples were measured in the above-mentioned manner, and the results are shown in Tables 1-3 below. In Examples and Comparative Examples, the foaming property at the heat treatment and scales within the tanks used for the heat treatment were measured in the above-mentioned manner, and the results are shown in Tables 1-3 below. The other conditions and the like in Examples and Comparative Examples also are shown in Tables 1-3.

TABLE 1

| | | Examples | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Polymer solid content (weight part) | | 100 | 100 | 100 | 100 | 100 | 100 | 100 | 100 | 100 | 100 | 100 |
| Polymer composition Weight ratio of vinyl chloride monomer:vinyl acetate monomer | | 100:0 | 100:0 | 100:0 | 100:0 | 100:0 | 100:0 | 100:0 | 100:0 | 100:0 | 100:0 | 100:0 |
| Water-soluble flocculant | Type of inorganic salt | | | | | | Sodium sulfate | | | | | |
| | Addition amount of inorganic salt (weight part) | 1 | 1 | 1 | 1 | 1 | 1 | 1 | 1 | 1 | 1 | 1 |
| | Type of water-soluble polymer | | | | | | Polyvinyl alcohol | | | | | |
| | Addition amount of water-soluble polymer (weight part) | 0.5 | 0.5 | 0.5 | 0.5 | 0.5 | 0.5 | 0.5 | 0.5 | 0.5 | 0.5 | 0.5 |
| Concentration of polymer solid in coagulated latex (wt %) | | 30 | 30 | 30 | 35 | 35 | 40 | 42 | 40 | 40 | 35 | 35 |
| Temperature for preparation of coagulated latex (° C.) | | 40 | 40 | 40 | 40 | 40 | 40 | 40 | 40 | 40 | 40 | 40 |
| Shear force at coagulation operation | | Moderate | Moderate | Moderate | Strong | Strong | Strong | Strong | Strong | Strong | Strong | Strong |
| Concentration of polymer solid in tank after primary heat treatment (wt %) | | 30 | 30 | 30 | 18 | 18 | 18 | 18 | 18 | 18 | 18 | 18 |
| Heating medium at primary heat treatment | | | Water vapor | | | | Water bath and water vapor | | | | | |
| Primary heat treatment temperature (° C.) | | 95 | 95 | 90 | 95 | 95 | 95 | 80 | 115 | 95 | 95 | 95 |
| Primary heat treatment time (minute) | | 30 | 30 | 30 | 30 | 30 | 30 | 30 | 30 | 30 | 0.5 | 300 |
| Secondary heat treatment temperature (° C.) | | 140 | 120 | 140 | 115 | 125 | 125 | 125 | 125 | 150 | 125 | 125 |
| Secondary heat treatment time (minute) | | 15 | 15 | 15 | 15 | 15 | 15 | 15 | 15 | 15 | 15 | 15 |
| Mean volume particle diameter of aggregate particles after secondary heat treatment (μm) | | 162 | 65 | 156 | 455 | 377 | 254 | 428 | 861 | 276 | 323 | 250 |
| Mean volume particle diameter of aggregate particles (after pulverization) (μm) | | 21 | 13 | 18 | 27 | 33 | 14 | 23 | 17 | 51 | 28 | 19 |
| Percentage of particles having a particle diameter of 10 to 60 μm in aggregate particles (vol. %) | | 58 | 65 | 63 | 61 | 70 | 71 | 65 | 68 | 53 | 71 | 72 |

TABLE 1-continued

| | Examples | | | | | | | | | | |
|---|---|---|---|---|---|---|---|---|---|---|---|
| | 1 | 2 | 3 | 4 | 5 | 6 | 7 | 8 | 9 | 10 | 11 |
| $\eta 70/\eta 40$ value | 688 | 96 | 498 | 7 | 10 | 15 | 10 | 26 | 788 | 12 | 9 |
| Foaming property at heat treatment | — | — | — | A | A | A | A | A | A | A | A |
| Scale within tank | A | A | A | A | A | A | B | B | B | A | A |
| Non-infiltrating property | A | A | A | B | A | A | A | A | A | A | A |
| Sagging property | B | A | B | A | A | A | A | A | A | A | A |

TABLE 2

| | Examples | | | | | | | | | |
|---|---|---|---|---|---|---|---|---|---|---|
| | 12 | 13 | 14 | 15 | 16 | 17 | 18 | 19 | 20 | 21 |
| Polymer solid content (weight part) | 100 | 100 | 100 | 100 | 100 | 100 | 100 | 100 | 100 | 100 |
| Polymer composition Weight ratio of vinyl chloride monomer:vinyl acetate monomer | 100:0 | 100:0 | 100:0 | 100:0 | 100:0 | 100:0 | 95:5 | 90:10 | 85:15 | 100:0 |
| Water-soluble flocculant — Type of inorganic salt | Sodium sulfate | | | Calcium chloride | Aluminum sulfate | Sodium chloride | Sodium sulfate | | | |
| Addition amount of inorganic salt (weight part) | 1 | 1 | 1 | 1 | 1 | 1 | 1 | 1 | 1 | 1 |
| Type of water-soluble polymer | Methyl cellulose | *1 | *2 | Polyvinyl alcohol | | | | | | |
| Addition amount of water-soluble polymer (weight part) | 0.5 | 0.5 | 0.5 | 0.5 | 0.5 | 0.5 | 0.5 | 0.5 | 0.5 | 0.5 |
| Concentration of polymer solid in coagulated latex (wt %) | 35 | 35 | 35 | 35 | 35 | 35 | 35 | 35 | 35 | 30 |
| Temperature for preparation of coagulated latex (° C.) | 40 | 40 | 40 | 40 | 40 | 40 | 40 | 40 | 40 | 40 |
| Shear force at coagulation operation | Strong | Strong | Strong | Strong | Strong | Strong | Strong | Strong | Strong | Weak |
| Concentration of polymer solid in tank after primary heat treatment (wt %) | 18 | 18 | 18 | 18 | 18 | 18 | 18 | 18 | 18 | 18 |
| Heating medium at primary heat treatment | Water bath and water vapor | | | | | | | | | |
| Primary heat treatment temperature (° C.) | 95 | 95 | 95 | 95 | 95 | 95 | 90 | 85 | 80 | 95 |
| Primary heat treatment time (minute) | 30 | 30 | 30 | 30 | 30 | 30 | 30 | 30 | 30 | 15 |
| Secondary heat treatment temperature (° C.) | 125 | 125 | 125 | 125 | 125 | 125 | 120 | 115 | 110 | 125 |
| Secondary heat treatment time (minute) | 15 | 15 | 15 | 15 | 15 | 15 | 15 | 15 | 15 | 15 |
| Mean volume particle diameter of aggregate particles after secondary heat treatment (μm) | 121 | 226 | 143 | 389 | 119 | 251 | 369 | 426 | 559 | 365 |
| Mean volume particle diameter of aggregate particles (after pulverization) (μm) | 18 | 21 | 22 | 24 | 20 | 19 | 20 | 21 | 23 | 21 |
| Percentage of particles having a particle diameter of 10 to 60 μm in aggregate particles (vol. %) | 58 | 69 | 63 | 72 | 70 | 71 | 61 | 58 | 62 | 54 |
| $\eta 70/\eta 40$ value | 8 | 34 | 7 | 105 | 45 | 11 | 242 | 366 | 603 | 719 |
| Foaming property at heat treatment | B | B | B | A | A | A | A | A | A | A |
| Scale iwithin tank | A | A | A | A | A | A | A | A | B | B |
| Non-infiltrating property | A | A | A | A | A | A | A | A | A | B |
| Sagging property | A | A | A | A | A | A | B | B | B | B |

*1: Low-saponification degree polyvinyl alcohol
*2: Hydroxypropylmethylcellulose

TABLE 3

| | Comparative Examples | | | | | |
|---|---|---|---|---|---|---|
| | 1 | 2 | 3 | 4 | 5 | 6 |
| Polymer solid content (weight part) | 100 | 100 | 100 | 100 | 100 | 100 |
| Polymer composition Weight ratio of vinyl chloride monomer:vinyl acetate monomer | 100:0 | 100:0 | 100:0 | 100:0 | 100:0 | 100:0 |
| Water-soluble flocculant — Type of inorganic salt | Sodium sulfate | | | | | |
| Addition amount of inorganic salt (weight part) | 1 | 1 | 1 | 1 | 1 | 1 |
| Type of water-soluble polymer | Polyvinyl alcohol | | | | | |
| Addition amount of water-soluble polymer (weight part) | 0.5 | 0.5 | 0.5 | 0.5 | 0.5 | 0.5 |
| Concentration of polymer solid in coagulated latex (wt %) | 30 | 40 | 40 | 40 | 30 | 35 |
| Temperature for preparation of coagulated latex (° C.) | 40 | 40 | 40 | 40 | 40 | 40 |
| Shear force at coagulation operation | Moderate | Strong | Strong | Strong | Moderate | Strong |
| Concentration of polymer solid in tank after primary heat treatment (wt %) | 30 | 18 | 18 | 18 | 30 | 18 |
| Heating medium at primary heat treatment | Water vapor | Water bath and water vapor | | | Water vapor | Water bath and water vapor |
| Primary heat treatment temperature (° C.) | 95 | 95 | 75 | 120 | 140 | 95 |
| Primary heat treatment time (minute) | 30 | 30 | 30 | 30 | 15 | 30 |

TABLE 3-continued

|  | Comparative Examples | | | | | |
| --- | --- | --- | --- | --- | --- | --- |
|  | 1 | 2 | 3 | 4 | 5 | 6 |
| Secondary heat treatment temperature (° C.) | 110 | 160 | 125 | 125 | — | 125 |
| Secondary heat treatment time (minute) | 15 | 15 | 15 | 15 | — | 15 |
| Mean volume particle diameter of aggregate particles after secondary heat treatment (μm) | 43 | 340 | 1360 | 760 | 266 | 377 |
| Mean volume particle diameter of aggregate particles (after pulverization) (μm) | 6 | 76 | 31 | 8 | 22 | 20 |
| Percentage of particles having a particle diameter of 10 to 60 μm in aggregate particles (vol. %) | 2 | 26 | 43 | 31 | 56 | 45 |
| η70/η40 value | 3 | 1105 | 7 | 4 | 1226 | 10 |
| Foaming property at heat treatment | — | A | A | A | — | A |
| Scale within tank | A | C | C | C | C | A |
| Non-infiltrating property | C | B | C | B | A | C |
| Sagging property | B | C | B | B | C | B |

As clearly shown in Tables 1 and 2, a plastisol using the vinyl chloride-based resin aggregate particles of each of Examples 1-21 where the mean volume particle diameter is 10 to 60 μm, the percentage of particles having the particle diameter of 10 to 60 μm is at least 50 vol. %, and η70/η40 is 3 to 1000, have a favorable non-infiltrating property and a favorable sagging property. It is also shown that the sagging property is further favorable when η70/η40 is 5 to 100. In an Example where the coagulated latex of the vinyl chloride-based resin is subjected to a primary heat treatment at a predetermined temperature of not lower than Tg and not higher than Tg+35° C., and subjected to a secondary heat treatment at a predetermined temperature within a temperature range of not lower than Tg+35° C. and not higher than Tg+70° C. and higher than the primary heat treatment temperature, vinyl chloride-based resin aggregate particles that can provide favorable sagging property and non-infiltrating property to the plastisol are obtained, and furthermore, scale formation within the tank used for the heat treatments was inhibited. Further it is shown that when polyvinyl alcohol was used for the water-soluble polymer, the foaming property at the time of heat treatment will be further enhanced. It is also shown that when the temperature at the time of the secondary heat treatment is 120° C. or higher, vinyl chloride-based resin aggregate particles with further improved non-infiltrating property can be obtained. It is also shown that when the temperature at the time of the secondary heat treatment is 140° C. or lower, scale formation within the tank for the heat treatment can be inhibited more effectively. It is also shown that when the primary heat treatment temperature is 90° C. or higher, scale formation within the tank for the heat treatment can be inhibited more effectively. And it is also shown that when the primary heat treatment temperature is 100° C. or lower, scale formation within the tank for the heat treatment can be inhibited more effectively.

On the contrary, as shown in Table 3, in the Comparative Example 1 where the secondary heat treatment was carried out at 110° C. that is lower than the predetermined temperature, the mean volume particle diameter of the vinyl chloride-based resin aggregate particles (pulverized particles) was smaller than 10 μm, the percentage of particles having a particle diameter of 10 to 60 μm was less than 50 vol. %, and the evaluation of the non-infiltrating property was C. In the Comparative Example 2 where the secondary heat treatment was carried out at 160° C. that is higher than the predetermined temperature, the mean volume particle diameter of the vinyl chloride-based resin aggregate particles (pulverized particles) exceeded 60 μm, the percentage of particles having a particle diameter of 10 to 60 μm was less than 50 vol. %, the η70/η40 exceeded 1000, and the evaluation of the sagging property was C. Moreover, a large amount of scales were formed within the tank for the heat treatment. In the Comparative Example 3 where the primary heat treatment was carried out at 75° C. that is lower than the predetermined temperature, the percentage of particles having a particle diameter of 10 to 60 μm was less than 50 vol. %, the evaluation of the non-infiltrating property was C, and a large amount of scales were formed within the tank used for the heat treatment. In the Comparative Example 4 where the primary heat treatment was carried out at 120° C. that is higher than the predetermined temperature, the percentage of particles having a particle diameter of 10 to 60 μm was less than 50 vol. %, and a large amount of scales were formed within the tank used for the heat treatment. In the Comparative Example 5 where such a two-stage heat treatment was not carried out and a heat treatment was carried out at 140° C., the η70/η40 of the vinyl chloride-based resin aggregate particles exceeded 1000, the sagging property was inferior, and a large amount of scales were formed within the tank used for the heat treatment. And, in the Comparative Example 6 where the percentage of particles having a particle diameter of 10 to 60 μm was less than 50 vol. %, the evaluation of the non-infiltrating property was C.

INDUSTRIAL APPLICABILITY

By covering a sheet, a glove, a bag and the like with a vinyl chloride-based resin using the vinyl chloride-based resin aggregate particles obtained in the process of the present invention, a sheet, a glove, a bag and the like that have high mechanical strength and excellent wear resistance, chemical resistance, and oil resistance and that can be used in various field such as fisheries, agriculture, mining and the like can be provided.

EXPLANATION OF LETTERS AND NUMERALS

10 First mixer
11 Second mixer
12 Pump
13 Vapor mixer
14,22 Water vapor
15,16,25 Stirrer
20 Mixer
21 50 L tank
23 Hot water

The invention claimed is:

1. A process for producing the vinyl chloride-based resin aggregate particles, comprising:
   a primary heat treatment step of heating a coagulated latex of the vinyl chloride-based resin at a temperature not lower than Tg and not higher than Tg+35° C. when Tg is a glass transition temperature of the vinyl chloride-based resin; and
   a secondary heat treatment step of heating after the primary heat treatment step at a temperature in a range not lower than Tg+35° C. and not higher than Tg+70° C. and higher than the heat treatment temperature for the primary heat treatment step,
   wherein the primary heat treatment is carried out by adding the coagulated latex of the vinyl chloride-based resin into the water bath in a case where the concentration of the polymer solid in the coagulated latex of the vinyl chloride-based resin is 35% by weight or more, and
   in the secondary treatment, a predetermined treatment temperature is set by use of water vapor, wherein the vinyl chloride-based resin comprises aggregate particles have a mean volume particle diameter of 10 to 60 μm, and the percentage of particles having a particle diameter of 10 to 60 μm is at least 50% by volume, a plastisol comprising 100 parts by weight of the aggregate particles and 160 parts by weight of di-2-ethylhexyl phthalate satisfies a relationship of $3 \leq \eta 70 \leq \eta 40 \leq 1000$ when $\eta 40$ is a viscosity at a shear rate of $1\ s^{-1}$ of a plastisol retained at 40° C. for 10 minutes and $\eta 70$ is a viscosity at a shear rate of $1\ s^{-1}$ of a plastisol that has been warmed from 40° C. at 10° C./min. and retained at 70° C. for 3 minutes.

2. A process for producing the vinyl chloride-based resin aggregate particles, comprising:
   a primary heat treatment step of heating a coagulated latex of the vinyl chloride-based resin at a temperature not lower than Tg and not higher than Tg+35° C. when Tg is a glass transition temperature of the vinyl chloride-based resin; and
   a secondary heat treatment step of heating after the primary heat treatment step at a temperature in a range not lower that Tg+35° C. and not higher than Tg+70° C. and higher than the heat treatment temperature for the primary heat treatment step,
   wherein the primary heat treatment step is carried out by mixing the coagulated latex of vinyl chloride-based resin with at least one heating medium selected from the group consisting of water vapor and water bath in a case where the concentration of the polymer solid in the coagulated latex of the vinyl chloride-based resin is less than 35% by weight, and
   in the secondary treatment, a predetermined treatment temperature is set by use of water vapor, wherein the vinyl chloride-based resin comprises aggregate particles have a mean volume particle diameter of 10 to 60 μm, and the percentage of particles having a particle diameter of 10 to 60 μm is at least 50% by volume, a plastisol comprising 100 parts by weight of the aggregate particles and 160 parts by weight of di-2-ethylhexyl phthalate satisfies a relationship of $3 \leq \eta 70 \leq \eta \leq 1000$ when $\eta 40$ is a viscosity at a shear rate of $1\ s^{-1}$ of a plastisol retained at 40° C. for 10 minutes and $\eta 70$ is a viscosity at a shear rate of $1\ s^{-1}$ of a plastisol that has been warmed from 40° C. at 10° C./min. and retained at 70° C. for 3 minutes.

3. The process for producing the vinyl chloride-based resin aggregate particles according to claim 1, wherein the vinyl chloride-based resin is a vinyl chloride resin.

4. The process for producing the vinyl chloride-based resin aggregate particles according to claim 1, wherein the primary heat treatment step is carried out at a temperature of 80 to 115° C.

5. The process for producing the vinyl chloride-based resin aggregate particles according to claim 1, wherein the secondary heat treatment step is carried out at a temperature of 115 to 150° C.

6. The process for producing the vinyl chloride-based resin aggregate particles according to claim 1, wherein the coagulated latex of the vinyl chloride-based resin is obtained by mixing the vinyl chloride-based resin latex and a water-soluble flocculant.

7. The process for producing the vinyl chloride-based resin aggregate particles according to claim 6, wherein the water-soluble flocculant is at least one flocculant selected from the group consisting of a water-soluble polymer and an inorganic salt.

8. The process for producing the vinyl chloride-based resin aggregate particles according to claim 1, wherein the coagulated latex of vinyl chloride-based resin contains a polymer solid at a concentration of 35 to 42% by weight, and the coagulated latex of the vinyl chloride-based resin is poured continuously through a pipe having an inner diameter of at least 20 mm into a vessel for the primary heat treatment.

9. The process for producing the vinyl chloride-based resin aggregate particles according to claim 1, wherein the vinyl chloride-based resin aggregate particles obtained after the secondary heat treatment has a mean volume particle diameter of 50 to 1000 μm, and the vinyl chloride-based resin aggregate particles obtained after the secondary heat treatment is pulverized so that the vinyl chloride-based resin aggregate particles have a mean volume particle diameter of 10 to 60 μm and that the percentage of particles having a particle diameter of 10 to 60 μm is at least 50% by volume.

10. The process for producing the vinyl chloride-based resin aggregate particles according to claim 2, wherein the vinyl chloride-based resin is a vinyl chloride resin.

11. The process for producing the vinyl chloride-based resin aggregate particles according to claim 2, wherein the primary heat treatment step is carried out at a temperature of 80 to 115° C.

12. The process for producing the vinyl chloride-based resin aggregate particles according to claim 2, wherein the secondary heat treatment step is carried out at a temperature of 115 to 150° C.

13. The process for producing the vinyl chloride-based resin aggregate particles according to claim 2, wherein the coagulated latex of the vinyl chloride-based resin is obtained by mixing the vinyl chloride-based resin latex and a water-soluble flocculant.

14. The process for producing the vinyl chloride-based resin aggregate particles according to claim 13, wherein the water-soluble flocculant is at least one flocculant selected from the group consisting of a water-soluble polymer and an inorganic salt.

15. The process for producing the vinyl chloride-based resin aggregate particles according to claim 2, wherein the vinyl chloride-based resin aggregate particles obtained after the secondary heat treatment has a mean volume particle diameter of 50 to 1000 μm, and the vinyl chloride-based resin aggregate particles obtained after the secondary heat treatment is pulverized so that the vinyl chloride-based resin aggregate particles have a mean volume particle diameter of 10 to 60 μm and that the percentage of particles having a particle diameter of 10 to 60 μm is at least 50% by volume.

* * * * *